United States Patent
Park et al.

(10) Patent No.: US 9,253,604 B2
(45) Date of Patent: Feb. 2, 2016

(54) MOBILE DEVICE FOR DISTINGUISHING USER'S MOVEMENT, METHOD THEREFOR, AND METHOD FOR GENERATING HIERARCHICAL TREE MODEL THEREFOR

(71) Applicant: Soongsil University Research Consortium Techno-Park, Seoul (KR)

(72) Inventors: Young Tack Park, Seoul (KR); Je Min Kim, Seoul (KR); Myoung Joong Jeon, Seoul (KR); Jagvaral Batselem, Seoul (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 0 days.

(21) Appl. No.: 14/791,776

(22) Filed: Jul. 6, 2015

(65) Prior Publication Data

US 2015/0312720 A1    Oct. 29, 2015

Related U.S. Application Data

(63) Continuation of application No. PCT/KR2013/012381, filed on Dec. 30, 2013.

(30) Foreign Application Priority Data

Jan. 7, 2013 (KR) .......................... 10-2013-0001693

(51) Int. Cl.
*H04W 4/02* (2009.01)
*H04W 88/02* (2009.01)

(52) U.S. Cl.
CPC .............. *H04W 4/027* (2013.01); *H04W 88/02* (2013.01)

(58) Field of Classification Search
CPC ............................ H04W 4/027; H04W 88/02
See application file for complete search history.

(56) References Cited

U.S. PATENT DOCUMENTS

| | | | | |
|---|---|---|---|---|
| 2010/0217672 A1* | 8/2010 | Maeno | ....................... | G01S 5/02 705/14.58 |
| 2014/0143791 A1* | 5/2014 | Mark | ....................... | G06F 9/485 719/318 |
| 2014/0278220 A1* | 9/2014 | Yuen | ....................... | G01B 21/16 702/150 |

FOREIGN PATENT DOCUMENTS

| | | |
|---|---|---|
| EP | 2 264 988 A1 | 12/2010 |
| KR | 10-2011-0101343 A | 9/2011 |
| KR | 10-2011-0126057 A | 11/2011 |
| KR | 10-2011-0136671 A | 12/2011 |
| KR | 10-2012-0056687 A | 6/2012 |

OTHER PUBLICATIONS

International Search Report for PCT/KR2013/012381 dated Mar. 24, 2014.

* cited by examiner

*Primary Examiner* — Kashif Siddiqui
(74) *Attorney, Agent, or Firm* — Pearne & Gordon LLP

(57) ABSTRACT

A mobile device for distinguishing a user's movement, a method therefor, and a method for generating a hierarchical tree model therefor. Particularly, the mobile device includes: an acceleration sensor; a buffer for collecting the acceleration data outputted from the acceleration sensor according to a user's specific movement; an extraction unit for extracting the characteristic elements of the user's specific movement based on the acceleration data collected by the buffer; and a movement judgment unit for determining to which class the user's specific movement belongs by inputting the characteristic elements extracted by the extraction unit into a pre-structured hierarchical tree model, wherein the hierarchical tree model is pre-structured based on the characteristic elements extracted for each movement.

10 Claims, 6 Drawing Sheets

MOBILE DEVICE FOR DISTINGUISHING USER'S MOVEMENT, METHOD THEREFOR, AND METHOD FOR GENERATING HIERARCHICAL TREE MODEL THEREFOR

CROSS-REFERENCE TO RELATED APPLICATION

This application is a continuation application of PCT Application No. PCT/KR2013/012381 filed on Dec. 30, 2013, which claims the benefit of Korean Patent Application No. 10-2013-0001693 filed on Jan. 7, 2013, the entire disclosures of which are incorporated herein by reference.

TECHNICAL FIELD

The embodiments described herein pertain generally to a mobile device for distinguishing a user's movement behavior, a method for distinguishing a user's movement behavior, and a method for generating a hierarchical tree model therefor.

BACKGROUND ART

In recent, mobile devices such as smart phones have been widely used, and various applications (APPs) utilizing sensors equipped within smart phones such as acceleration sensors, gyroscope sensors, geomagnetic sensors, gravity sensors, optical sensors, proximity sensors, and motion recognition sensors are being developed.

Especially, research on a technology of determining in what state a user who is using a smart phone is moving, and research on a technology of providing a smart service based on the determination technology are also being conducted. In this case, to determine a user's movement behavior, a technology that can purify data received from a sensor within a smart phone to obtain meaningful data is necessary.

In this regard, Korean Patent Application Publication No. 2011-0126057 (Title of Invention: Device for Determining Movement Sate, Method for Determining Movement State, and Recording Medium) describes determining the state of a user, by comparing an acceleration fluctuation cycle of a vertical component and an acceleration fluctuation cycle of a horizontal component with each other from outputs of an acceleration sensor.

However, a method that can more accurately distinguish a user's movement behavior in another way different from the above-described technique has been continuously demanded. Especially, the conventional technology that distinguishes a user's movement behavior by using GPS, a microphone or the like has had a problem in that it increases consumption of a battery of a smart phone.

DISCLOSURE OF THE INVENTION

Problems to be Solved by the Invention

In order to solve the foregoing problems, some of example embodiments provide a method for generating a hierarchical tree model, which is capable of improving accuracy in extraction of a characteristic of a movement behavior by overlapping part of data collected from an acceleration sensor.

In addition, some of example embodiments provide a mobile device capable of distinguishing to which movement behavior a user's specific movement behavior corresponds, with high reliability based on a hierarchical tree model constructed by using only data collected from an acceleration sensor, and a method for distinguishing a user's movement behavior by using the mobile device.

However, the problems sought to be solved by the present disclosure are not limited to the above description, and other problems can be clearly understood by those skilled in the art from the following description.

Means for Solving the Problems

In one example embodiment, there is provided a mobile device for distinguishing a movement behavior of a user. The mobile device comprises: an acceleration sensor; a buffer that collects acceleration data output from the acceleration sensor according to a specific movement behavior of the user; an extraction unit that extracts and outputs a characteristic factor for the specific movement behavior of the user based on the acceleration data collected in the buffer; and a movement behavior determination unit that distinguishes to which movement behavior the specific movement behavior of the user corresponds, by inputting the characteristic factor extracted by the extraction unit into a pre-constructed hierarchical tree model, wherein the hierarchical tree model is pre-constructed based on the characteristic factor extracted for each movement behavior, and the characteristic factor for each movement behavior is extracted based on a first frame group and a second frame group, and the first frame group consists of acceleration data collected separately for each movement behavior and divided based on a preset time unit, and the second frame group consists of acceleration data collected separately for each movement behavior and divided based on a time unit different from the preset time unit, and part of the acceleration data of the second frame group overlaps with the first frame group.

In another example embodiment, there is provided a method for generating a hierarchical tree model for distinguishing a movement behavior of a user having a mobile device. The method comprises: collecting acceleration data separately for each movement behavior from an acceleration sensor within the mobile device; dividing the acceleration data for each movement behavior based on a preset time unit to construct a first frame group, and dividing the acceleration data for each movement behavior based on a time unit different from the preset time unit to construct a second frame group, part of the acceleration data of the second frame group overlaps with the first frame group; extracting a characteristic factor for each movement behavior that is distinguished from characteristic factors for other movement behaviors, based on the first and second frame groups; and constructing the hierarchical tree model based on the characteristic factor for each movement behavior.

In other example embodiment, there is provided a method for distinguishing a movement behavior of a user by using a mobile device. The method comprises: collecting acceleration data output from an acceleration sensor within the mobile device according to a specific movement behavior of the user; extracting a characteristic factor for the specific movement behavior of the user based on the acceleration data; and distinguishing to which movement behavior the specific movement behavior of the user corresponds, by inputting the extracted characteristic factor into a pre-constructed hierarchical tree model, wherein the hierarchical tree model is pre-constructed based on a characteristic factor extracted for each movement behavior, and the characteristic factor for each movement behavior is extracted based on a first frame group and a second frame group, and the first frame group consists of acceleration data collected separately for each movement behavior and divided based on a preset time unit, and the second frame group consists acceleration data collected separately for each movement behavior and divided based on a time unit different from the preset time unit, and part of the acceleration data of the second frame group overlaps with the first frame group.

Effect of the Invention

As one of the above-described technical means of the example embodiments, the method for generating a hierarchical tree model can generate a hierarchical tree model for distinguishing to which movement behavior a user's specific movement behavior corresponds, with higher reliability and accuracy, by extracting a characteristic factor of each movement behavior based on first and second frame groups, which are constructed such that parts of acceleration data overlap with each other.

In addition, as one of the technical means of the example embodiments, the mobile device and the method for distinguishing a user's movement behavior by using the mobile device can accurately distinguish to which movement behavior a user's specific movement behavior corresponds, only based on acceleration data, by using a pre-constructed hierarchical tree model, which reflects a characteristic factor optimally extracted for each movement behavior. Additionally, since a separate device like GPS, a microphone or others for the distinguishing operation is unnecessary, energy of the mobile device can be more effectively used.

DETAILED DESCRIPTION

Figure 1:
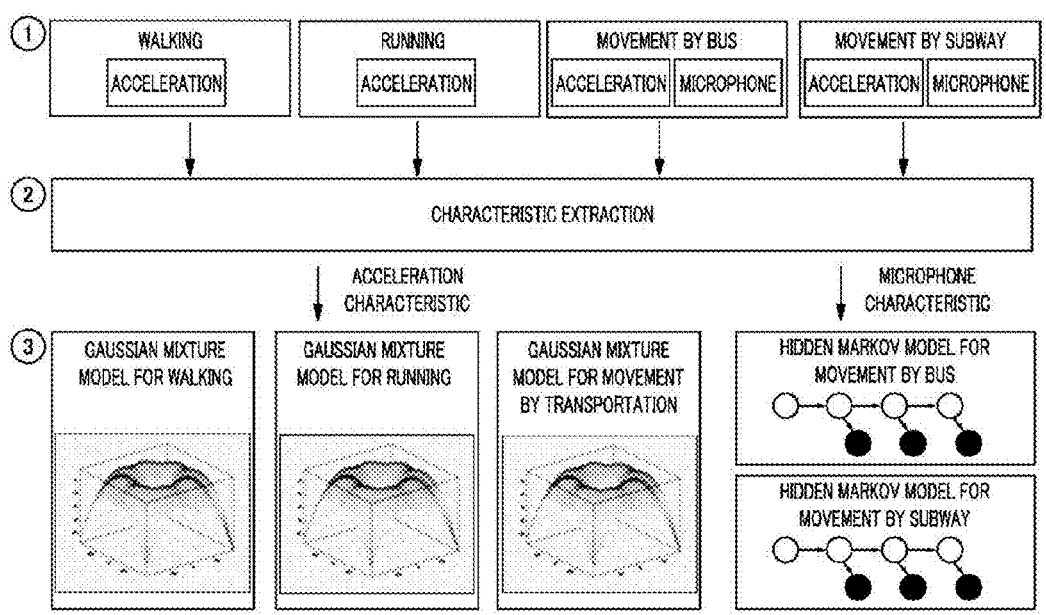
FIG. 1 shows a method for distinguishing a user's movement behavior according to a conventional technology.

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. Further, the term "comprises or includes" and/or "comprising or including" used in the document means that one or more other components, steps, operations, and/or the existence or addition of elements are not excluded in addition to the described components, steps, operations and/or elements.

FIG. 1 shows a method for distinguishing a user's movement behavior according to a conventional technology. In order to distinguish a user's movement behavior, a pre-work of generating a model for each movement behavior may be performed.

In order to perform a pre-work of generating a model for a "walking" or "running" movement behavior, data may be collected from an acceleration sensor equipped within a smart phone as illustrated in FIG. 1 (①). An acceleration sensor allowing 50 recordings per second may be used. By using a characteristic for "walking" or "running" extracted from the data collected for about 2 hours (②), a "Gaussian mixture model (GMM) for walking," a "Gaussian mixture model (GMM) for running," or a "Gaussian mixture model (GMM) for movement by a transportation" may be generated (③). Based on these models, it is possible to calculate a weighting of Gaussian and an average/covariance of data representing Gaussian, and based on the calculation result, it is possible to distinguish a user's actual movement behavior.

In addition, in order to perform a pre-work of generating a model for a movement behavior of "movement by bus" or "movement by subway," data may be collected from each of an acceleration sensor and a microphone equipped within a smart phone as illustrated in FIG. 1 (①). A microphone allowing 500 recordings per second may be used. By using a characteristic for the "movement by bus" or "movement by subway" extracted from the data collected for about 2 hours (②), a "hidden Markov model (HMM) for movement by bus" or "hidden Markov model (HMM) for movement by subway" may be generated (③). Based on these models, it is possible to estimate a state conversion parameter, and based on the estimation result, it is possible to distinguish a user's actual movement behavior.

That is, by using the technology illustrated in FIG. 1, it is possible to distinguish to which of walking, running, movement by bus, and movement by subway a user's movement behavior corresponds. However, the technology suggested in the example embodiments below can more accurately distinguish a user's movement behavior, without using the conventional Gaussian mixture model (GMM) or hidden Markov model (HMM).

Figure 2:
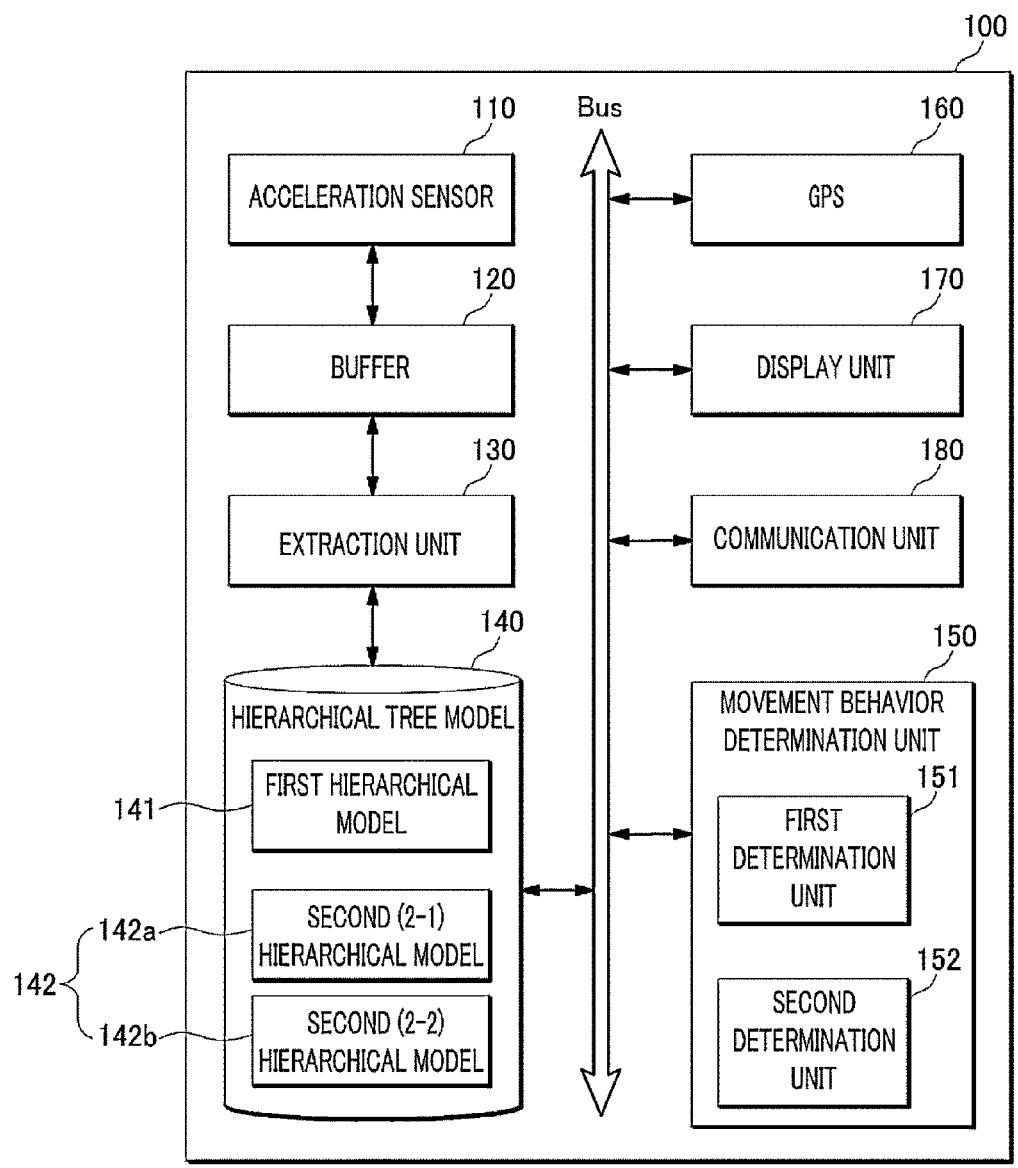
FIG. 2 is a configuration diagram showing a mobile device for distinguishing a user's movement behavior in accordance with an example embodiment.

FIG. 2 is a configuration diagram showing a mobile device 100 that distinguishes a user's movement behavior in accordance with an example embodiment. With reference to FIG. 2, the mobile device 100 includes an acceleration sensor 110, a buffer 120, an extraction unit 130, a hierarchical tree model 140, a movement behavior determination unit 150, GPS 160, a display unit 170 and a communication unit 180. However, the mobile device 100 illustrated in FIG. 2 is merely an example embodiment of the present disclosure, and may be modified through various combinations based on the components illustrated in FIG. 2.

In this case, the mobile device 100 may be embodied as a portable device or a computer that can transmit and receive data through a network. Here, the portable device is, for example, a wireless communication device assuring portability and mobility, and may include any type of a handheld-based wireless communication device like a personal communication system (PCS), a global system for mobile communication (GSM), a personal digital cellular (PDC), a personal handyphone system (PHS), a personal digital assistant (PDA), international mobile telecommunication (IMT)-2000, code division multiple access (CDMA)-2000, W-code division multiple access (W-CDMA), a wireless broadband Internet (Wibro) terminal, a smart phone and a smart pad. In addition, the computer may include, for example, a notebook, a desktop, a laptop, a tablet PC and others, which are equipped with Web browser.

In addition, the mobile device 100 may be connected to various servers through a network. The network means a connection structure that enables exchange of data or information among nodes such as terminals and servers, and examples for the network include, but not limited to, a mobile radio communication network, a satellite broadcasting network, an analogue broadcasting network, a digital multimedia broadcasting (DMB) network, the Internet, a local area network (LAN), a wireless local area network (LAN), a wide area network (WAN), a personal area network (PAN), and so on. An application including the function capable of distinguishing a user's movement behavior suggested in the example embodiments may be provided in the mobile device 100 through download, or provided at the time that the device is manufactured by a device manufacturer.

Each of the components of the mobile device 100 suggested in the example embodiments is specifically described, referring to FIG. 2 again.

The acceleration sensor 110 is provided within the mobile device 100 to measure change of speed. The acceleration sensor 110 is not specifically limited with respect to a sensing method, a sensing principle, an appearance condition and others.

The buffer 120 collects acceleration data output from the acceleration sensor 110 according to a user's specific movement behavior. The buffer 120 is a kind of a high-speed memory device that exchanges acceleration data between the above-described acceleration sensor 110 and the extraction unit 130, which will be described later, and may compensate difference in a transmission speed or a processing speed between the two components and favorably combine the components to each other.

In this case, the acceleration data collected in the buffer 120 may vary depending on a type of the specific movement behavior, and the user's specific movement behavior may mean, for example, any one movement behavior of "running," "walking," "stopping," "subway riding," "bus riding" and "car riding." The buffer 120 may collect acceleration data output from the acceleration sensor 110 for about 3 seconds.

The extraction unit 130 extracts a characteristic factor for the user's specific movement behavior based on the acceleration data collected in the buffer 120.

For example, the extraction unit 130 compresses the acceleration data output from the acceleration sensor 110 for about 3 seconds according to the user's specific movement behavior to be one unit. For the compressed data, the extraction unit 130 may extract a vertical average, a vertical standard deviation, a vertical average crossing rate, a vertical 75 percentile, a vertical interquartile, an average of a vertical spectrum, vertical frequency complexity, a horizontal average, a horizontal standard deviation, a horizontal average crossing rate, a horizontal 75 percentile, a horizontal interquartile, an average of a horizontal spectrum, horizontal frequency complexity, a vertical-horizontal correlation and others.

In addition, the extraction unit 130 may extract the characteristic factor for the user's specific movement behavior, by using the same method as the method, by which the hierarchical tree model 140 extracts a characteristic factor for each movement behavior, as described later. However, the extraction unit 130 may extract the characteristic factor for the user's specific movement behavior through another method without regard to specific limitation.

The movement behavior determination unit 150 distinguishes to which movement behavior the user's certain movement behavior corresponds, by inputting the characteristic factor extracted by the extraction unit 130 into the pre-constructed hierarchical tree model 140. That is, the movement behavior determination unit 150 may search a characteristic factor matching with the extracted characteristic factor for the user's specific movement behavior within the pre-constructed hierarchical tree model 140, and determine to which movement behavior the user's specific movement behavior corresponds, according to the matching result.

Figure 3:
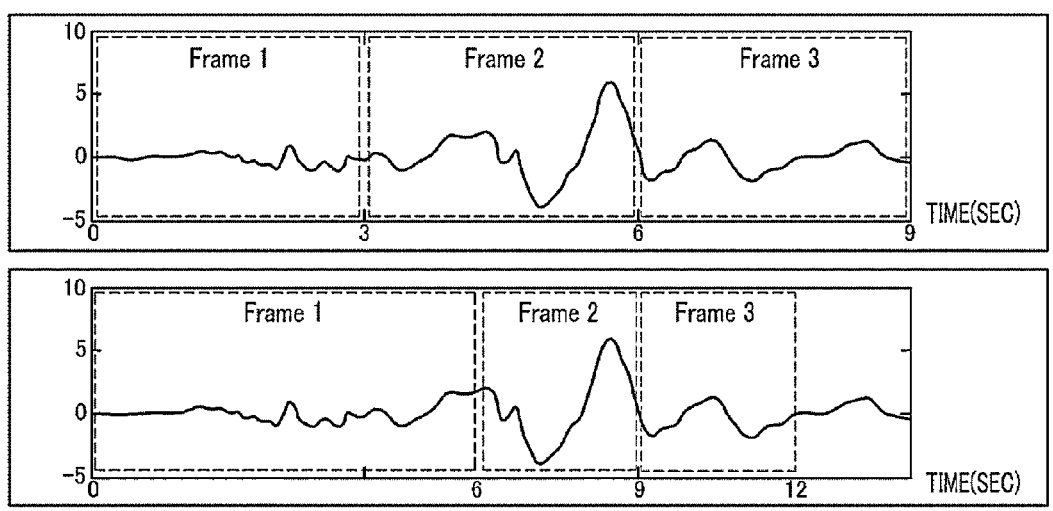
FIG. 3 shows an example for extraction of a characteristic factor for a movement behavior.

Especially, the hierarchical tree model 140 is pre-constructed based on a characteristic factor extracted for each movement behavior. In this case, a characteristic factor for each movement behavior is extracted based on first and second frame groups, which are described hereinafter with reference to FIG. 3. FIG. 3 shows an example for extraction of a characteristic factor for a movement behavior.

The first view of FIG. 3 shows constructing a first frame group by dividing acceleration data collected separately for each movement behavior based on a preset time unit. For example, if acceleration data collected for the "running" movement behavior are divided based on a 3-second unit, the first frame group may be constructed to include Frames 1, 2 and 3, and each of the frames may consist of 150 "running" sample data.

The second view of FIG. 3 shows a second frame group constructed by dividing acceleration data collected separately for each movement behavior based on another time unit different from the preset time unit, and part of the acceleration data of the second frame group may overlap with part of the acceleration data of the first frame group. For example, the acceleration data collected for the same "running" movement behavior as described above are divided based on another time unit which is different with the 3-second unit, such that the second frame group including Frames 1, 2 and 3 may be constructed, and each of the frames may consist of 300 "running" sample data. In this case, part of the acceleration data overlaps with each other in the first and second frame groups.

As a result, the hierarchical tree model 140, which reflects a characteristic factor optimally extracted for each movement behavior, may be constructed. In addition, the movement behavior determination unit 150 may distinguish to which movement behavior a user's specific movement behavior corresponds, with high reliability, by using the hierarchical tree model 140 pre-constructed only based on the acceleration data.

Further, the hierarchical tree model 140 is essential for distinguishing a user's movement behavior only based on acceleration data, and the hierarchical tree model 140 is pre-constructed prior to occurrence of a user's actual specific movement behavior, to be stored within the mobile device 100 or a server or a database connected to the mobile device 100 through a network.

Sample configuration of the hierarchical tree model 140 and the movement behavior determination unit 150 is described, referring to FIG. 2 again.

The hierarchical tree model 140 may include a multiple number of hierarchical models to determine to which movement behavior a user's specific movement behavior corresponds, at least two (2) consecutive times, and be constructed to include a first hierarchical model 141, a second (2-1) hierarchical model 142*a* and a second (2-2) hierarchical model 142*b* as shown in FIG. 2. The first hierarchical model 141 is pre-constructed based on characteristic factors for behaviors of riding and not riding a transportation, the second (2-1) hierarchical model 142*a* is pre-constructed based on a characteristic factor for a movement behavior using a multiple number of preset transportations, and the second (2-2) hierarchical model 142b is pre-constructed based on characteristic factors for running, walking and stopping movement behaviors.

The movement behavior determination unit 150 may determine to which movement behavior a user's specific movement behavior corresponds, in cooperation with the hierarchical tree model 140, and include a first determination unit 151 associated with the above-described first hierarchical model 141, and a second determination unit 152 associated with the above-described second (2-1) and second (2-2) hierarchical models 142a and 142b. That is, the first determination unit 151 may determine to which of the behaviors of riding and not riding a transportation a user's specific movement behavior corresponds, by inputting the characteristic factor extracted from the extraction unit 130 into the first hierarchical model 141. If the first determination unit 151 has determined that the user's specific movement behavior corresponds to the behavior of riding a transportation, the second determination unit 152 may determine which of the multiple number of the preset transportations (e.g., a car, a subway, and a bus) is taken for the riding behavior of the user's specific movement behavior, by inputting the characteristic factor extracted from the extraction unit 130 into the second (2-1) hierarchical model 142a. In addition, if the first determination unit 151 has determined that the user's specific movement behavior corresponds to the behavior of not riding a transportation, the second determination unit 152 may determine to which of the running, walking and stopping behaviors the user's specific movement behavior corresponds, by inputting the characteristic factor extracted from the extraction unit 130 into the second (2-2) hierarchical tree model 142b. Since the movement behavior determination unit 150 distinguishes a user's movement behavior according to the tree routes of the hierarchical tree model 140 at least two (2) consecutive times, it can improve the accuracy in distinguishing a user's movement behavior.

GPS (Global Positioning System) 160 is provided within the mobile device 100 to receive position information of the mobile device 100. In this case, the position information may include two-dimensional data consisting of longitude and latitude values or three-dimensional data consisting of longitude, latitude, and height values.

When receiving the position information from GPS 160, the movement behavior determination unit 150 may more accurately correct or check the distinguishment result through the hierarchical tree model 140, based on the position information. That is, the position information received from GPS 160 may perform an auxiliary function to determine to which movement behavior a user's specific movement behavior corresponds.

The display unit 170 displays the determination result of the above-described movement behavior determination unit 150 on a screen. Through the screen, a user may identify the performance of the mobile device 100 to distinguish a user's movement behavior.

The communication unit 180 may transfer the determination result by the above-described movement behavior determination unit 150 to a server or another device connected to the mobile device 100 through a network. The server or another device may process the information to provide a smart service to a user. The smart service may be provided by an application provided within the mobile device 100, without passing through the communication unit 180.

Additionally, each of the components illustrated in FIG. 2 may be configured as a kind of a 'module.' This 'module' means a software component or a hardware component like a field programmable gate array (FPGA) and an application specific integrated circuit (ASIC), and performs certain functions. However, the module is not limited to the software or the hardware. The module may be configured to be provided in an addressable storage medium or execute one or more processors. The functions provided by the components and the modules may be combined with one another to result in a smaller number of components or modules or divided into further components or modules.

Meanwhile, the method for generating a hierarchical tree model in accordance with each example embodiment is described with reference to FIG. 4 and FIG. 5. That is, the above-described hierarchical tree model 140 may be constructed by the method described below, to be pre-stored within the mobile device 100 or a server or a database connected to the mobile device 100 through a network. Through the hierarchical tree model 140, it is possible to distinguish to which movement behavior a specific movement behavior of a user having the mobile device 100 corresponds.

Figure 4:
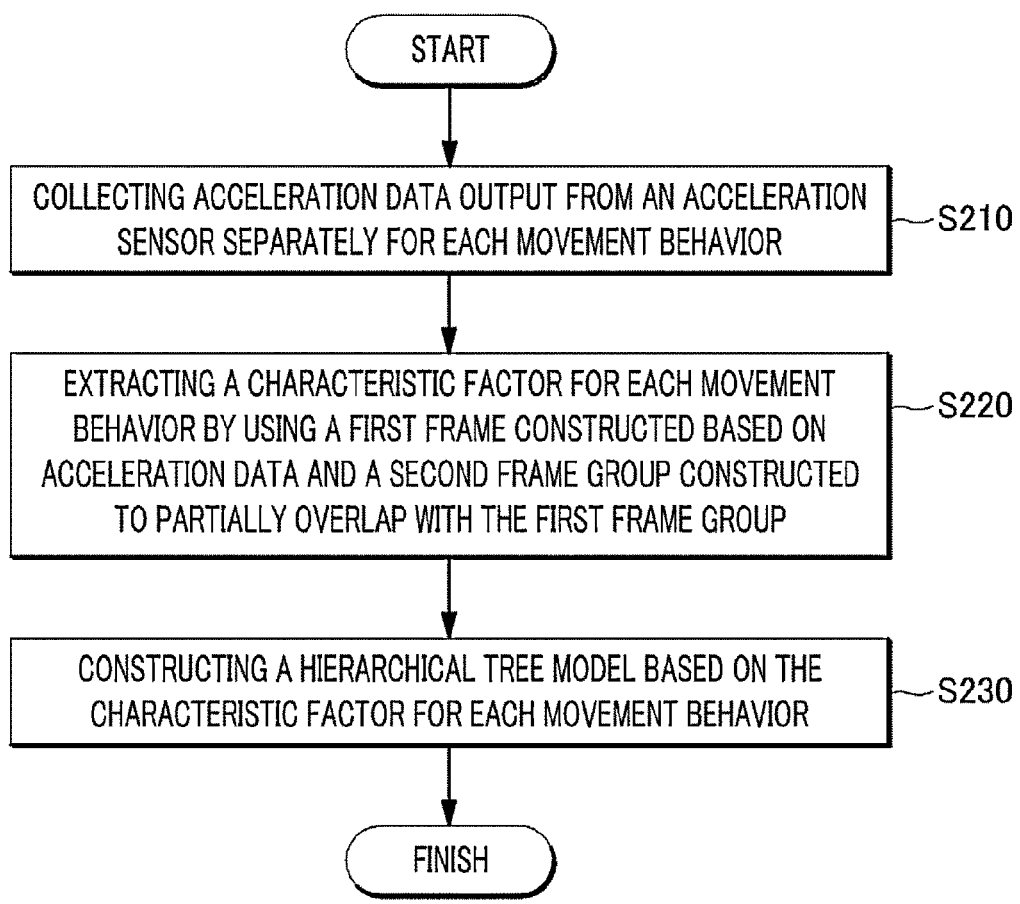
FIG. 4 is a flow chart showing a method for generating a hierarchical tree model in accordance with an example embodiment.

FIG. 4 is a flow chart showing a method for generating a hierarchical tree model in accordance with an example embodiment. Here, the mobile device 100 may be a test terminal used by a manager for the hierarchical tree model 140 or a terminal provided with a separate application.

In order to generate the hierarchical tree model 140, the mobile device 100 collects acceleration data separately for each movement behavior from the acceleration sensor 110 (S210). For example, the mobile device 100 may distinguish and collect acceleration data for a "walking" movement behavior and acceleration data for a "bus riding" behavior.

The mobile device 100 extracts a characteristic factor for each of the movement behaviors, by using a first frame group constructed based on the acceleration data distinguished for each of the movement behaviors and a second frame group constructed to partially overlap with the first frame group (S220). As described above with reference to the first view of FIG. 3, the mobile device 100 constructs the first frame group (Frames 1, 2, and 3) by dividing the acceleration data distinguished for each of the movement behaviors based on a preset time unit. In addition, as described above with reference to the second view of FIG. 3, the mobile device 100 constructs the second frame group (Frames 1, 2 and 3), by dividing the acceleration data distinguished for each of the movement behaviors based on another time unit different from the preset time unit, and allowing part of the acceleration data to overlap with the acceleration data of the first frame group. Based on the first and second frame groups that have been constructed, the mobile device 100 may extract a characteristic factor for each of the movement behaviors distinguishable from characteristic factors for other movement behaviors, with high reliability.

The mobile device 100 constructs the hierarchical tree model 140 based on the extracted characteristic factor for each of the movement behaviors (S230). Accordingly, it is possible to generate the hierarchical tree model 140 that can distinguish to which movement behavior a user's specific movement behavior corresponds with high reliability, only by using the acceleration sensor within the mobile device 100.

Figure 5:
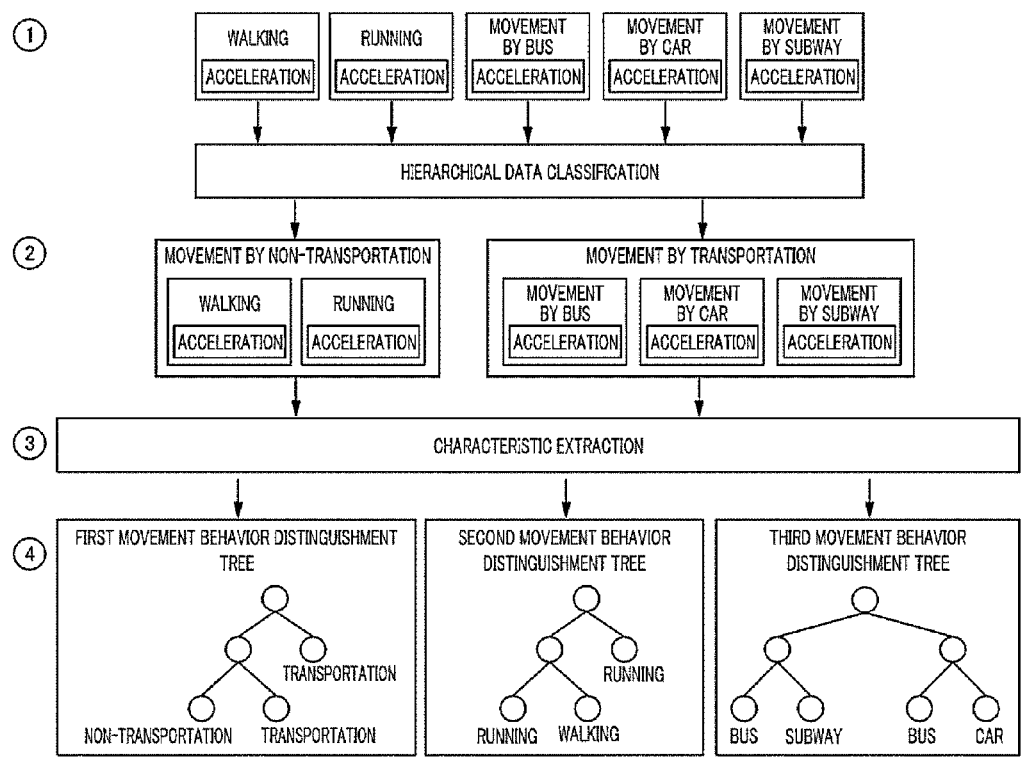
FIG. 5 shows a method for generating a hierarchical tree model in accordance with another example embodiment.

FIG. 5 shows a method for generating a hierarchical tree model in accordance with another example embodiment.

In order to generate a hierarchical tree model capable of distinguishing each movement behavior like "walking," "running," "movement by bus," "movement by car," "movement by subway" or others, the mobile device 100 collects acceleration data from the acceleration sensor 110 as illustrated in FIG. 5 (①). Thereafter, the mobile device 100 distinguishes the acceleration data for each of the movement behaviors to enable each of the movement behaviors to form a class (②). For example, each of the movement behaviors may become hierarchical such that the acceleration data corresponding to the "walking" and "running" behaviors are arranged under the behavior of "riding a non-transportation." The mobile device 100 extracts a characteristic factor for each of the movement behaviors distinguished from characteristic factors for other movement behaviors, by using the first frame group constructed based on the acceleration data distinguished for each of the movement behaviors, and the second frame group constructed to partially overlap with the first frame group (③). Based on the extracted characteristic factor for each of the movement behaviors, the mobile device 100 constructs the hierarchical tree model 140 in various forms as illustrated in FIG. 5 (④).

Figure 6:
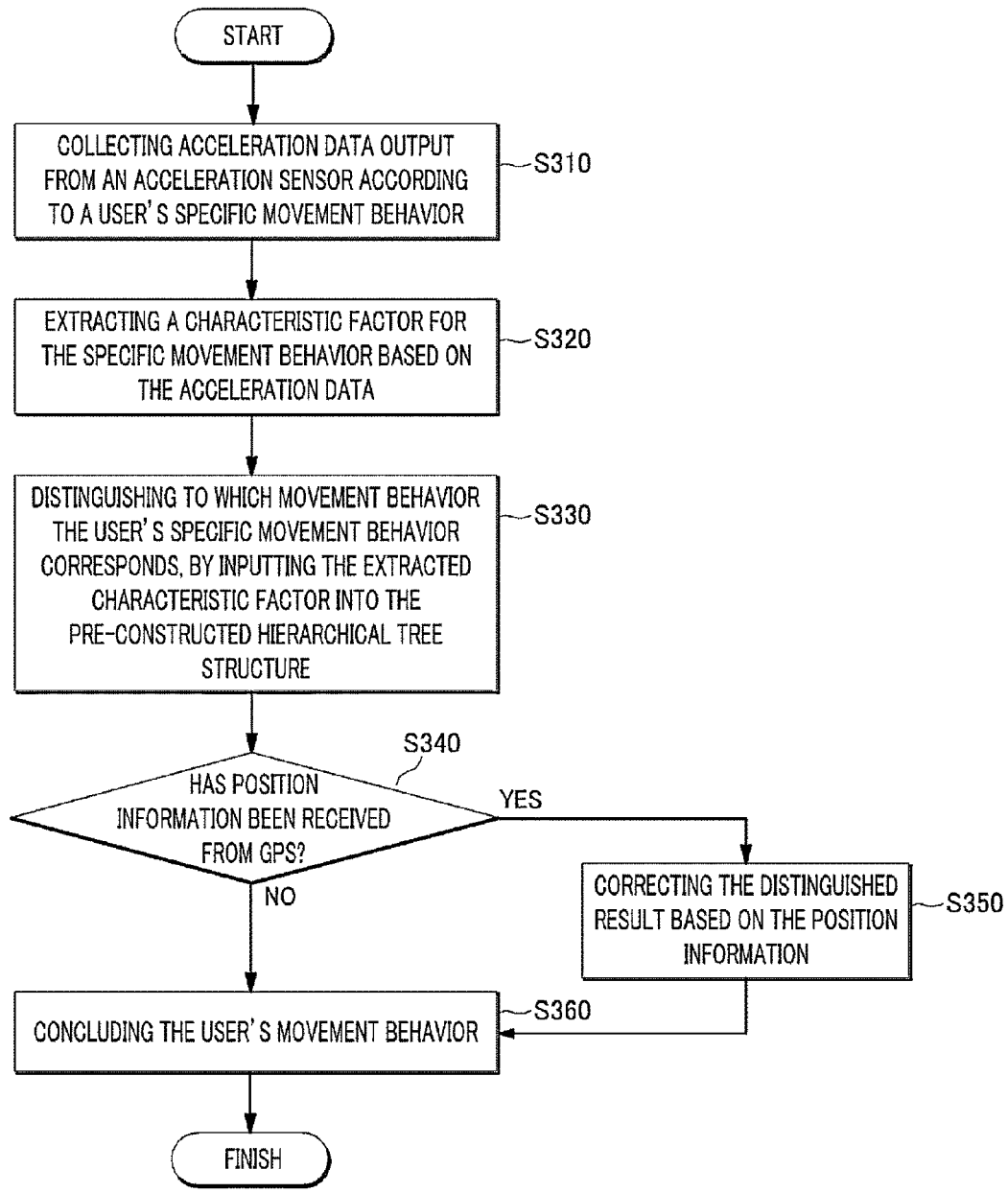
FIG. 6 is a flow chart showing a method for distinguishing a user's movement behavior in accordance with an example embodiment.

Meanwhile, a method for distinguishing a user's movement behavior, based on the method for generating a hierarchical tree model as described above with reference to FIG. 4 and FIG. 5, is described hereinafter in detail with reference to FIG. 6. FIG. 6 is a flow chart showing a method for distinguishing a user's movement behavior in accordance with an example embodiment. That is, the mobile device 100 may distinguish a user's movement behavior, based on the hierarchical tree model 140 pre-stored within the mobile device 100 or a server or a database connected to the mobile device 100 through a network.

The mobile device 100 collects acceleration data output from the acceleration sensor 110 within the mobile device 100 according to a user's specific movement behavior (S310). In this case, the user's specific movement behavior may be any one movement behavior of "running," "walking," "stopping," "subway riding," "bus riding," and "car riding."

Subsequently, the mobile device 100 extracts a characteristic factor for the user's specific movement behavior based on the acceleration data (S320). In this case, the extracting method may be the same as described above with reference to FIG. 4 and FIG. 5, but is not specifically limited thereto.

The mobile device 100 distinguishes to which movement behavior the user's specific movement behavior corresponds, by inputting the extracted characteristic factor into the pre-constructed hierarchical tree model (S330). In this case, the hierarchical tree model has been pre-constructed based on the characteristic factor extracted for each of the movement behaviors. In addition, the characteristic factor for each of the movement behaviors has been extracted based on a first frame group constructed by dividing the acceleration data collected separately for each of the movement behaviors based on a preset time unit, and a second frame group constructed by dividing the acceleration data collected separately for each of the movement behaviors based on another time unit different from the preset time unit and allowing part of the acceleration data to overlap with the first frame group.

Specifically, in S330, the mobile device 100 may distinguish to which movement behavior the user's specific movement behavior corresponds, through a process for determination at least two (2) consecutive times.

More specifically, the mobile device 100 may undergo a first determination process for distinguishing to which of behaviors of riding and not riding a transportation a user's specific movement behavior corresponds. Thereafter, if the user's specific movement behavior corresponds to the behavior of riding a transportation, the mobile device 100 may distinguish which of a multiple number of preset transportations is taken for the riding behavior of the user's specific movement behavior. If the user's specific movement behavior corresponds to the behavior of not riding a transportation, the mobile device 100 may distinguish to which movement behavior of running, walking and stopping the user's specific movement behavior corresponds.

After distinguishing to which movement behavior the user's specific movement behavior corresponds, the mobile device 100 may further determine whether position information is received from GPS 160 (S340). If there is position information that has been received (Yes), the mobile device 100 corrects the movement behavior result distinguished in S330 based on the position information (S350), and then, concludes the correction result as a user's movement behavior (S360). If no position information has been received (No), the mobile device 100 may conclude the movement behavior result distinguished in S330 as a user's movement behavior (S360).

As described above, the mobile device and the method for distinguishing a user's movement behavior by using the mobile device as suggested in the example embodiments can accurately distinguish to which movement behavior a user's specific movement behavior corresponds, only based on acceleration data, by using a pre-constructed hierarchical tree model that reflects a characteristic factor optimally extracted for each movement behavior. Additionally, since a separate device like GPS or a microphone for the distinguishing operation is unnecessary, energy of the mobile device can be more effectively used.

The example embodiments can be embodied in a storage medium including instruction codes executable by a computer or processor such as a program module executed by the computer or processor. A computer readable medium can be any usable medium which can be accessed by the computer and includes all volatile/nonvolatile and removable/non-removable media. Further, the computer readable medium may include all computer storage and communication media. The computer storage medium includes all volatile/nonvolatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the description of the example embodiments. It shall be understood that all modifications and embodiments conceived from the meaning and scope of the claims and their equivalents are included in the scope of the inventive concept.

We claim:

1. A mobile device for distinguishing a movement behavior of a user, comprising:
    an acceleration sensor;
    a buffer that collects acceleration data output from the acceleration sensor according to a specific movement behavior of the user;
    an extraction unit that extracts and outputs a characteristic factor for the specific movement behavior of the user based on the acceleration data collected in the buffer; and a movement behavior determination unit that distinguishes to which movement behavior the specific movement behavior of the user corresponds, by inputting the characteristic factor extracted by the extraction unit into a pre-constructed hierarchical tree model, wherein the hierarchical tree model is pre-constructed based on characteristic factors extracted for each movement behavior, and the characteristic factor for each movement behavior is extracted based on a first frame group and a second frame group, and the first frame group consists of acceleration data collected separately for each movement behavior and divided based on a preset time unit, and the second frame group consists of acceleration data collected separately for each movement behavior and divided based on a time unit different from the preset time unit, and wherein part of the acceleration data of the second frame group overlaps with the first frame group.

2. The mobile device of claim 1,
wherein the extraction unit extracts the characteristic factor for the specific movement behavior of the user, by using a same method as a method, by which the hierarchical tree model extracts the characteristic factor for each movement behavior.

3. The mobile device of claim 1,
wherein the movement behavior determination unit comprises:
a first determination unit that distinguishes to which movement behavior the specific movement behavior of the user corresponds, by inputting the characteristic factor extracted by the extraction unit into a first hierarchical model pre-constructed based on characteristic factors for behaviors of riding and not riding a transportation; and
a second determination unit that distinguishes to which movement behavior the specific movement behavior of the user corresponds, by
inputting the characteristic factor extracted by the extraction unit into a second (2-1) hierarchical model pre-constructed based on characteristic factors for a plurality of preset transportations if the specific movement behavior of the user has been determined as the behavior of riding a transportation, and
inputting the characteristic factor extracted by the extraction unit into a second (2-2) hierarchical model pre-constructed based on characteristic factors for running, walking, and stopping if the specific movement behavior of the user has been determined as the behavior of not riding a transportation,
wherein the hierarchical tree model includes the first, the second (2-1) and the second (2-2) hierarchical models.

4. The mobile device of claim 1, further comprising
GPS that receives position information,
wherein when receiving the position information from GPS, the movement behavior determination unit inputs the position information into the hierarchical tree model to correct a distinguished result.

5. The mobile device of claim 1,
wherein the hierarchical tree model is stored within the mobile device or a server connected to the mobile device through a network.

6. A method for generating a hierarchical tree model for distinguishing a movement behavior of a user having a mobile device, comprising:

collecting acceleration data separately for each movement behavior from an acceleration sensor within the mobile device;
dividing the acceleration data for each movement behavior based on a preset time unit to construct a first frame group, and dividing the acceleration data for each movement behavior based on a time unit different from the preset time unit to construct a second frame group, wherein part of the acceleration data of the second frame group overlaps with the first frame group;
extracting a characteristic factor for each movement behavior that is distinguished from characteristic factors for other movement behaviors, based on the first and second frame groups; and
constructing the hierarchical tree model based on the characteristic factor for each movement behavior.

7. A method for distinguishing a movement behavior of a user by using a mobile device, comprising:
collecting acceleration data output from an acceleration sensor within the mobile device according to a specific movement behavior of the user;
extracting a characteristic factor for the specific movement behavior of the user based on the acceleration data; and
distinguishing to which movement behavior the specific movement behavior of the user corresponds, by inputting the extracted characteristic factor into a pre-constructed hierarchical tree model,
wherein the hierarchical tree model is pre-constructed based on a characteristic factor extracted for each movement behavior, and
the characteristic factor for each movement behavior is extracted based on a first frame group and a second frame group, and the first frame group consists of acceleration data collected separately for each movement behavior and divided based on a preset time unit, and the second frame group consists acceleration data collected separately for each movement behavior and divided based on a time unit different from the preset time unit, and wherein part of the acceleration data of the second frame group overlaps with the first frame group.

8. The method for distinguishing the movement behavior of the user of claim 7, further comprising
correcting a result distinguished in the distinguishing step based on position information, when the position information is received from GPS within the mobile device.

9. The method for distinguishing a movement behavior of a user of claim 7,
wherein the distinguishing step determines to which movement behavior the specific movement behavior of the user corresponds, at least two consecutive times.

10. The method for distinguishing a movement behavior of a user of claim 7,
wherein the distinguishing step comprises:
distinguishing to which of behaviors of riding and not riding a transportation the specific movement behavior of the user corresponds; and
distinguishing which of a plurality of preset transportations is taken if the specific movement behavior of the user corresponds to the behavior of riding a transportation, and distinguishing to which movement behavior of running, walking and stopping the specific movement behavior of the user corresponds if the specific movement behavior of the user corresponds to the behavior of not riding a transportation.

* * * * *